May 18, 1926.

J. A. FISCHER

CIRCUIT CLOSER

Filed Oct. 14, 1925    2 Sheets-Sheet 1

1,584,762

Inventor
John A. Fischer
By Owen & Owen
Attorneys

May 18, 1926.
J. A. FISCHER
CIRCUIT CLOSER
Filed Oct. 14, 1925      2 Sheets-Sheet 2
1,584,762
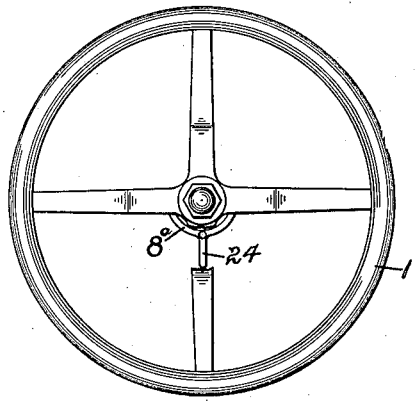
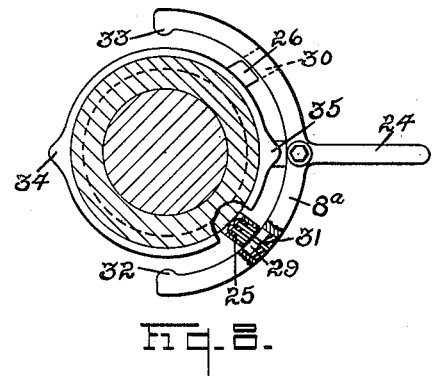
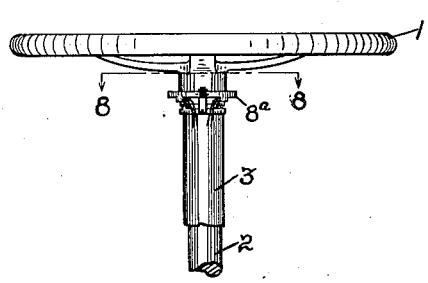
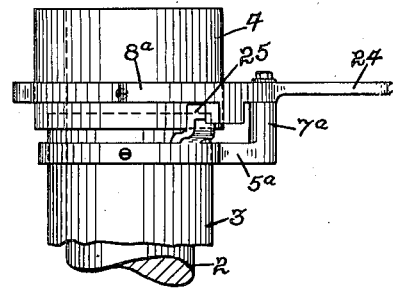
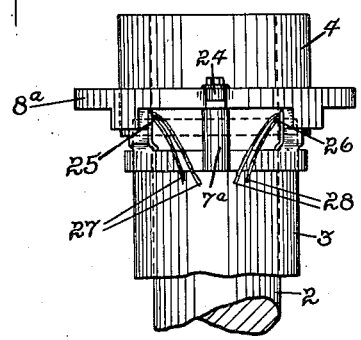

Patented May 18, 1926.

1,584,762

UNITED STATES PATENT OFFICE.

JOHN A. FISCHER, OF TOLEDO, OHIO.

CIRCUIT CLOSER.

Application filed October 14, 1925. Serial No. 62,370.

This invention relates to direction indicating devices for automobiles and the like, but is more particularly concerned with devices of this character which are associated with the steering wheel of the vehicle and conveniently positioned for manual operation.

Objects of this invention are to provide a simple, compact and improved operating device for direction indicating mechanism which may readily and conveniently be attached to the column surrounding the steering post; and to provide a device of the above character having the new and improved features of construction and arrangement hereinafter described.

In one aspect the invention comprises a unitary attachment for the steering column of vehicles which includes a single movable member for closing the circuits to energize the "right" signal or the "left" signal according to the manner in which it is moved. Cam means may be associated with the steering wheel so that after the circuit-closing member has been moved to circuit-closing position, this member will be returned to normal position by the cam means upon a predetermined turning of the wheel. An outstanding characteristic of the invention consists in the provision of a single movable actuating member which may be conveniently positioned under or adjacent to the steering wheel and presents a neat and attractive appearance and mounted in such a manner that liability of the device becoming inoperative or getting out of order from the vibration imparted by the vehicle is eliminated. It will also be apparent that owing to the simplicity of construction, the cost of manufacture is relatively low and also that the device may be installed on vehicles in an extremely simple manner.

Figure 1:
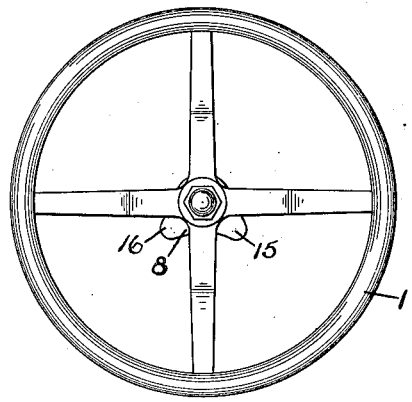
Figure 3:
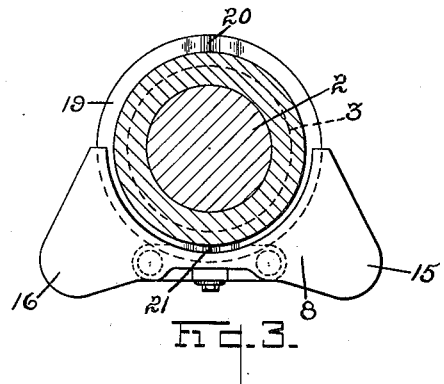
Figure 2:
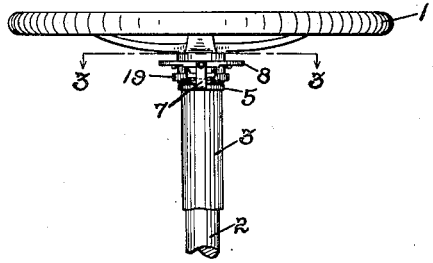
Figure 4:
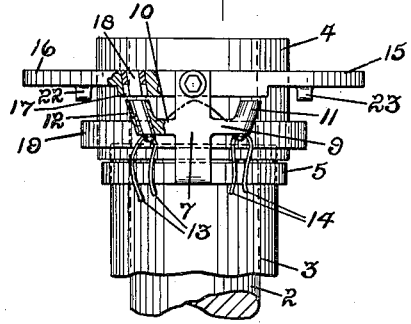
Figure 5:
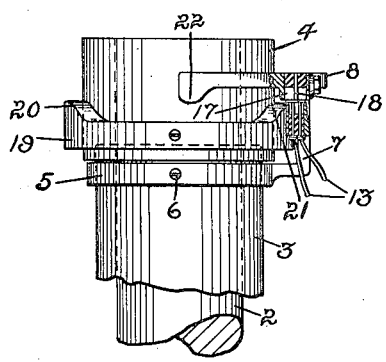

The invention is shown by way of illustration in the accompanying drawings, in which, Fig. 1 is a top plan view of a steering wheel embodying my invention; Fig. 2 is a side elevation of the steering wheel and associated parts; Fig. 3 is the section on the line 3—3 of Fig. 2; Fig. 4 is an enlarged side elevation of the construction shown in Fig. 3; Fig. 5 is a front elevation of the construction shown in Fig. 4; Fig. 6 is a top plan view of a steering wheel embodying a modified form of my invention; Fig. 7 is a side elevation of the construction shown in Fig. 6; Fig. 8 is a sectional view on the line 8—8 of Fig. 7; Fig. 9 is an enlarged side elevation of the construction shown in Fig. 8 and Fig. 10 is a front elevation of the construction shown in Fig. 9.

Referring to the form of my invention shown in Figs. 1 to 5, the steering wheel 1 is mounted in the usual manner on the post 2 which is surrounded or extends through the stationary column 3 and fixed to the steering wheel 1 and extending downwardly therefrom is an annular hub or flange 4. The above is the usual construction on automobiles.

Attached to the column 3 at a point directly beneath the hub 4 is a collar 5 secured thereto by screws 6. The collar 5 may be attached to the column 3 in any suitable or preferred manner, for instance, it may be constructed in two hingedly connected parts, but in the manner shown may be slid over the column 3 after the steering wheel 1 has first been removed. Provided on the collar 5 is an upstanding post or bracket 7 and pivoted to the upper end portion of the bracket 7 is a circuit closing member 8.

The bracket 7 is provided with oppositely extending arms 9 and 10 having upwardly and outwardly inclined lugs 11 and 12 respectively. The lugs 11 and 12 each support a set of contact terminals which may be in the form of relatively thin copper strips suitably insulated from each other and leading to the terminals in the lug 12 are wires 13 and leading to the terminals in the lug 11 are the wires 14. The pairs of wires 13 and 14 may extend in any suitable manner to direction indicating devices at the rear of the vehicles, the wires 14 controlling the right hand signal and the wire 13 controlling the left hand signal. Attention is directed to my copending application, Serial No. 18,665, filed March 27th, 1925, which shows a signal system of the type to which this invention relates and also shows a wiring diagram showing one manner in which the two sets of contact terminals may be connected to the direction indicating devices.

The circuit closing member 8 is pivoted intermediate its ends to the bracket 7 and is curved to extend closely around part of the circumference of the hub 4 and in this instance is formed with right and left wings or finger pieces 15 and 16 which enable the member 8 to be tilted in one direction or the other in a simple and convenient manner, it being observed that these wings extend outwardly from the hub 4 between the arms of the steering wheel as indicated in Fig. 1. Formed in the circuit closing member 8 on opposite sides of the bracket 7 and above the lugs 11 and 12 are recesses, a recess 17 shown in Fig. 5 being sufficiently large to receive a lug 12 so that the latter may telescope therein.

Secured in the recess 17 and insulated in any suitable manner from the member 8 is a contact piece 18 so arranged that when the wing 16 is depressed so that the lug 12 extends into the recess 17, the contact strip 18 extends between and into engagement with the contact terminals for the wires 13 thereby completing the circuit and energizing the left hand signal for the vehicle. It is to be understood that by tilting the member 8 to the right by depressing the wing 15, a contact strip extends between and engages the terminals for the wires 14 thus closing the circuit leading to the right hand signal. In this manner it will be understood that when the driver intends to turn to the left he will depress the wing 16, or if he desires to turn to the right the wing 15 will be depressed.

In order automatically to return the circuit closing member 8 to normal position after having been depressed, a cam ring 19 is attached in any suitable manner to the hub 4 and is provided with diametrically opposed upstanding cam surfaces 20 and 21. Formed on the opposite ends of the circuit-closing member 8 are downwardly projecting stops 22 and 23.

It will thus be observed that when the wing 16 is depressed the stop 22 engages the upper surface of the cam ring 19 and when the steering wheel 1 is turned a quarter turn the cam 20 engages the stop lug 22 and thereby moves the member 8 to its normal position thereby disconnecting the signal controlled by the wires 13. In a similar manner the cam 20 may engage the stop lug 23 on the opposite end of the circuit closing member and return this member to normal position when the steering wheel is turned to the right a quarter turn. In the event that a mistake is made and the driver depresses the wing 16 and thereafter decides to turn in the opposite direction, i. e., to the right, the cam 12 will engage the stop lug 22 and thereby return the circuit closing member to normal position, the cam also functioning to return the member to normal position should the wing 15 be accidently or improperly depressed and the driver turn in the opposite direction from that signal.

In the form of my invention illustrated in Figs. 6 to 10 inclusive, the collar 5ª is formed with the upstanding post or bracket 7ª to which an arcuately-shaped circuit-closing member 8ª is pivoted intermediate its ends a handle 24 extending outwardly from the member 8ª for actuation thereof. Formed on the collar 5ª are integral brackets 25 and 26 supporting the contact terminals for the pairs of wires 27 and 28 respectively. The circuit-closing member 8ª is formed with recesses 29 and 30, each having a contact strip 31 for electrically connecting the contact terminals of the wires in a manner similar to that heretofore described. Formed on the opposite ends of the circuit-closing member 8ª are stop lugs 32 and 33 which are adapted to engage the outer surface of the hub 4 when the handle 24 is moved in one direction or the other. For returning the circuit closing member 8ª to normal position diametrically opposed outwardly extending cam elements 34 and 35 are formed on the hub 4. The operation of this device is similar to that heretofore described, and it will suffice to say that movement of handle 24 to the right closes the circuit including the wires 28 and movement of the handle to the left closes the circuit including the wires 27 and the cams 34 and 35 return the circuit closing member 8ª to its normal position.

While I have shown and described two forms of my invention it is to be understood that the above description is given merely by way of illustration and not of limitation and numerous changes in details of construction, arrangement and operation may be effected without departing from the spirit of the invention, especially as defined in the appended claims.

What I claim as new and desire to secure by Letters Patent is:

1. In a device of the character described, the combination with a steering mechanism of a relatively stationary bracket, oppositely positioned contact terminals carried by said bracket, a steering post, a manually operable arcuately shaped lever in close juxtaposition to and partially surrounding said steering post and pivoted to said bracket, contact terminals on said lever engageable with the terminals on said bracket, and cam means connected to a part of said steering mechanism and engageable with said arm for returning said arm to normal position upon a predetermined movement of said steering post in either direction.

2. In a device of the character described, the combination with a steering mechanism of a relatively stationary bracket, oppositely positioned contact terminals carried by said bracket, a steering post, a manually operable arcuately shaped lever in close juxtaposition to and partially surrounding said steering post and pivoted to said bracket, said lever being mounted for swinging movement in a plane at right angles to the axis of said steering post, contact terminals on said lever engageable with the terminals on said bracket, and cam means connected to a part of said steering mechanism and engageable with said arm for returning said arm to normal position upon a predetermined movement of said steering post in either direction.

In testimony whereof I have hereunto signed my name to this specification.

JOHN A. FISCHER.